Aug. 20, 1935.  J. L. SHROYER  2,012,142
AUTOMOBILE BRAKE TESTING MECHANISM
Filed Dec. 26, 1934
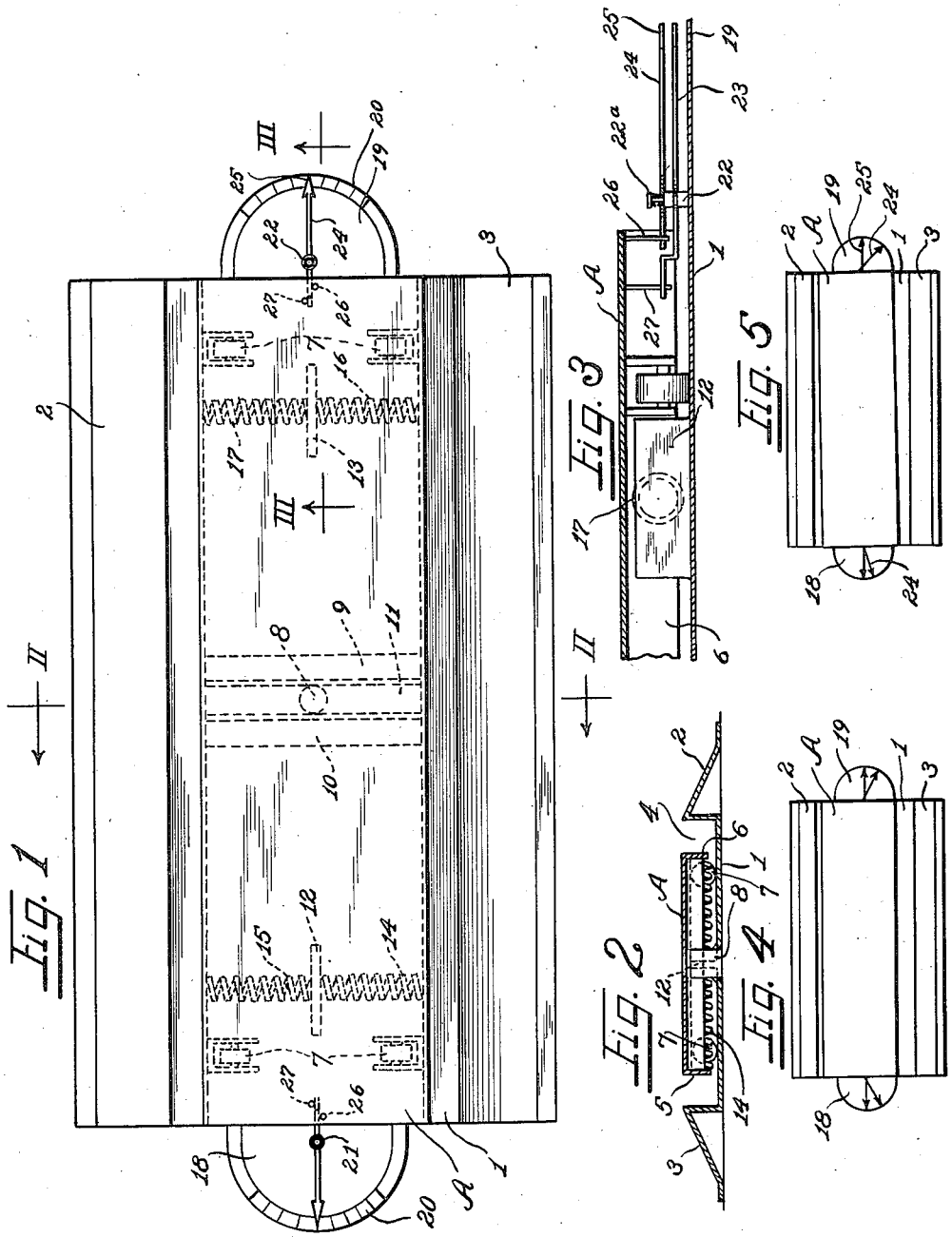
Inventor
Jacob L. Shroyer Patented Aug. 20, 1935

2,012,142

UNITED STATES PATENT OFFICE 2,012,142

AUTOMOBILE BRAKE TESTING MECHANISM

Jacob L. Shroyer, Oak Park, Ill.

Application December 26, 1934, Serial No. 759,187

8 Claims. (Cl. 73—51)

The present invention relates to automobile testing mechanism, and more particularly to a mechanism or apparatus for detecting and indicating the relative adjustment of the brakes of both wheels of a pair of automobile wheels, so that, in the event of maladjustment, the proper adjustment may be made.

It is necessary, for safe operation of automotive vehicles, that the brakes of both wheels of a pair apply equal braking effect to the wheels when the brakes are applied. This is especially true with four wheel brakes. Any braking differential present in the wheels of a pair of wheels of an automotive vehicle causes skidding of the vehicle, when the brakes are applied, and thus invites accidents.

Furthermore, in four wheel brakes, the amount of braking effect applied to the front wheels is different from, preferably less than, the braking effect applied to the rear wheels.

The present invention has for an object the provision of a simple, readily portable apparatus, which may be put anywhere for use, for testing the brake adjustment of both wheels of a pair of automotive vehicle wheels, that is to say, for testing both front wheels or both back wheels.

Another object of the present invention is to provide a brake testing apparatus whereby relative adjustment of the brakes of both wheels of a pair of wheels may be readily ascertained.

Still another object of the present invention is to provide an apparatus wherein the existence of braking effect of brakes of automotive vehicles may be observed.

Another and yet further object of the present invention is to provide a brake testing apparatus whereby the relative adjustment of the brakes of both wheels of a pair of automotive vehicle wheels may be readily ascertained, and wherein the existence of braking effect may be indicated.

The invention has for a still further object the provision of a simple, effective testing apparatus, which may be manufactured for sale at relatively low prices.

Another object of the present invention is to provide an apparatus for testing the relative adjustment of the brakes of both wheels of a pair of wheels of an automotive vehicle.

The above, other and further objects of the present invention will be apparent from the following description, accompanying drawing, and appended claims.

An embodiment of the present invention is illustrated in the accompanying drawing, and the views thereof are as follows:

Figure 1 is a top plan view of a brake testing mechanism constructed in accordance with the principles of the present invention.

Figure 2 is a vertical sectional view taken substantially in the plane indicated by the line II—II of Figure 1.

Figure 3 is a fragmental vertical sectional view taken substantially in the plane indicated by the line III—III of Figure 1.

Figure 4 is a top plan view of the illustrated form of the present invention showing the position assumed by the platform when it is bodily moved in a direction substantially perpendicular to its length, by a pair of automotive vehicle wheels overrunning the platform, with the brakes applied, and with the brakes in equal adjustment.

Figure 5 is a view similar to Figure 4, showing the platform slightly canted or oscillated, which position is assumed by the platform when a pair of automobile wheels overruns the platform and the adjustment of the brakes of the pair is uneven.

The drawing will now be explained.

The testing mechanism of the present invention is constructed so as to be readily portable and to be placed anywhere where convenient for use, such as on a garage floor, on the ground, or anywhere else.

The form of the invention, as illustrated, includes a base plate 1 having formed as integral parts thereof ramps 2 and 3, which are spaced from each other to form a well 4. A platform A is, in the present instance, constructed as a channel with its flanges 5 and 6 directed downwardly towards the base 1. The platform A is supported on the base 1 by means of rollers 7, four of which are shown. It is well understood, however, that the platform A might be supported in some other manner, the only requirement being that the platform be so mounted on the base as to be movable with respect thereto in a direction substantially perpendicular to the length of the platform and also oscillatably about a central point.

A stud 8 is suitably secured to the base 1 and rises therefrom and enters a guideway formed on the underside of the plate A, by means of angle bars 9 and 10, which bars are positioned crosswise of the length of the platform, and at midlength thereof, to provide the guideway 11. In order to center the platform A in normal position, that is, midway between the ramps 2 and 3, upstanding abutments 12 and 13 are attached to the base 1. Compensating springs 14, 15, 16 and 17 are arranged between the flanges 5 and 6 of the platform A, and the abutments 12 and 13. As illustrated, the springs 14 and 15 are arranged with adjacent ends against the abutment 12, while springs 16 and 17 are arranged with adjacent ends against the abutment 13. These springs are shown as coiled springs, although it is understood that other spring means may be employed in place of those specifically illustrated or that more springs may be utilized, each side of the stud 8, as occasion warrants.

Formed as end extensions of the base 1 are dials 18 and 19. Each of these dials has a graduated scale 20 on it, which graduations may be as desired and provided with proper characters of indicia to enable ready computation of the adjustment of the brakes being tested.

A pivot pin 21 rises from the dial 18, and a similar pin 22 from the dial 19. Secured to the pin 22, so as to swing thereabout as an axis are two superposed pointers 23 and 24. These pointers may be provided with arrowheads 25 for overlying the indicia on the dials. As illustrated, the inner end of the pointer 23 is longer than the inner end of the pointer 24. Depending from the adjacent end of the platform A is a pin 26 adapted to engage one side of the rear end of the pointer 24. In like manner, there is another pin 27 adapted to engage the inner end of the pointer 23. The engagement of the pin 27 is on the opposite side of the end of the pointer 23 than the pin 26, with respect to its pointer 24. A screw or like instrumentality 22a is suitably attached to the pin 22 so that the pointers may be removed or replaced, as occasion may require.

The construction of the pointers at the opposite ends of the apparatus is the same. Preferably, the rollers 7 are disposed in such a position as to underlie a pair of automotive vehicle wheels on the platform A. The operation of the brake testing mechanism is as follows:

To test the relative adjustment of the front wheel brakes of a vehicle, the brakes are applied and the vehicle driven across the platform A in a direction substantially perpendicular to its length. If the brakes are exerting braking action on the wheels, the instant the wheels strike the platform A, they will move the platform in a direction substantially perpendicular to its length against the opposition of the springs.

Let it be assumed that a vehicle approaches the tester in a direction from the bottom of the sheet, then the platform A would be bodily moved towards the top of the sheet, if the brakes were equally adjusted. The platform A then would occupy the position shown in Figure 4.

In the event that the brakes are unequally adjusted, so that the braking effect on one front wheel is different from that on the other front wheel, the platform then takes a cant or rotates slightly with that end of the platform underlying the wheel on which the brake is less effective, moving rearwardly towards normal position. Figure 5 illustrates the position of the platform A under such conditions.

As the platform A is moved towards the top of the sheet, the pins 26 would swing the pointers 24 over the scales 20 in accordance with the extent of movement of the platform. Any retrograde movement of the platform will not affect the pointers 24, as these have to be reset by hand. If the difference in brake adjustment of the two front wheels of an automotive vehicle, being tested, is abnormal, then the platform A may not be moved bodily substantially perpendicularly to its length, but instead may immediately be given the cant or swing, as illustrated in Figure 5. Under such conditions, the pin 26 at one end of the platform would swing its pointer 24 a different distance than would the pin 26 at the other end of the platform. Figure 5 illustrates the appearance the pointers 24 would have under such conditions. Such a state of affairs would readily indicate that there is maladjustment of the brakes of the front wheels of the vehicle. The brakes could then be adjusted, the wheels retested, and this continued until no swinging movement of the platform would occur when the wheels are driven onto and across it.

In testing the rear wheels of an automotive vehicle, approaching the tester from the direction of the bottom of the sheet towards the top, as soon as the driving wheels engage the platform, with the brakes set, the platform would be urged towards the bottom of the sheet, because of the tractive effect of the wheels on the platform. Under such conditions, the pins 27 would swing the pointers 23 a distance corresponding to the displacement of the ends of the platform.

The wheels are then brought to rest, while on the platform, by either disengaging the clutch or stopping the engine. The springs exert greater effort against the platform to return it to normal position than the braking effort holding the wheels. As a result, the platform A tends towards normal position. When the platform comes to rest at this point, the pointers are moved by hand against their pins in the then position of the platform. The amount of displacement of the platform is then read by observation of the pointers, and the test is finished.

As the platform tends to return to normal position, as just described, and if the brakes of the wheels being tested are equal the platform will not swing, but bodily move perpendicular to its length, towards the top of the sheet. If, however, the brakes are not equally adjusted, then the platform will swing about the pivot 8. The end of the platform underlying the wheel having the lesser braking effect will swing a greater distance than the other end of the platform, the difference being indicated by the pointers and their dials.

I am aware that many changes may be made and numerous details of construction may be varied through a wide range without departing from the principles of this invention, and I therefore, do not purpose limiting the patent granted hereon otherwise than necessitated by the prior art.

The invention is claimed as follows:

1. A self-contained, readily portable, automobile brake testing apparatus; said apparatus including a base plate and ramps spaced from each other; a platform supported on said base plate between said ramps and adapted for oscillatory movement about a central point and also for movement as a whole sidewise towards and away from the ramps; said platform adapted to be overrun at the same time by both wheels of a pair of automotive vehicle wheels and to be shifted as a whole substantially perpendicular to its length when the braking effect is present and both brakes are equally adjusted and to be oscillated when the braking effect is present and the brakes maladjusted; and means for indicating the amount of displacement of said platform by said vehicle wheels being tested.

2. A brake testing apparatus including a single movable platform adapted to receive a pair of automobile wheels the brakes of which are to be tested, means mounting said platform for bodily movement substantially perpendicular to its length and also for oscillatory movement about a central point, and means for indicating the amount of movement of said platform.

3. A brake testing apparatus including a single platform adapted to receive both wheels of a pair of automobile wheels the brakes of which are to be tested, said platform being adapted for oscillatory swinging movement about a central pivot and also adapted for movement in a direction substantially perpendicular to its length, springs opposing movement of said platform, and means for indicating the amount of movement of said platform.

4. A brake testing apparatus including a platform adapted to be overrun by a pair of automobile wheels and mounted for shifting movement substantially perpendicular to its length and also for oscillatory movement, and means for indicating the amount of shifting and oscillatory movement of said platform.

5. A brake testing mechanism including a base plate, a platform adapted to be overrun by both wheels of a pair of automobile wheels and mounted on said base for shifting and oscillatory movement with respect to the same, ramps integrally connected to said plate, dials connected to said plate, and pointers pivoted to said plate and operable by movement of said platform in shifting and oscillatory movements to indicate the amount of such movements.

6. Automobile brake testing mechanism including a base plate, a platform supported on said plate adapted to be overrun by a pair of automobile wheels and shiftable in a direction substantially perpendicular to its length and also oscillatable about a central point, and indicating means including a dial and a plurality of oscillatably movable pointers therefor, one of said pointers being operable by said platform when said platform is shifted or swung in one direction from its normal position and the other of said pointers being operable when said platform is shifted or swung in the reverse direction from normal position.

7. An automobile brake testing mechanism including a single movable platform adapted to be shifted perpendicularly to its length in either direction from normal position and also adapted for oscillatory movement with respect to a central point, spring means opposing movement of said platform from normal position, and dial and pointer means for indicating the amount of movement of said platform from normal position.

8. In an apparatus for comparing the brake adjustment of both wheels of a pair of automobile wheels and also for indicating the presence of braking effect, a single platform adapted to receive at the same time both wheels of a pair of automobile wheels, means mounting said platform for movement as a whole in a direction substantially perpendicular to its length and also for oscillation about a central point, the movement of said platform as a whole denoting presence of braking effect when the brakes on the wheels being tested are equally adjusted and oscillatory movement of said platform denoting presence of maladjustment of the brakes of the pair of wheels being tested, and means for indicating the amount of movement of said platform.

JACOB L. SHROYER.